United States Patent
Ito

(10) Patent No.: US 6,302,419 B1
(45) Date of Patent: Oct. 16, 2001

(54) SYSTEM AND METHOD FOR SWING RESTRICTION OF REAR AXLE OF INDUSTRIAL VEHICLE

(75) Inventor: Hideki Ito, Tokyo (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/168,682

(22) Filed: Oct. 9, 1998

(30) Foreign Application Priority Data

| Oct. 9, 1997 | (JP) | 9-277703 |
| May 12, 1998 | (JP) | 10-129249 |
| Jul. 24, 1998 | (JP) | 10-209855 |

(51) Int. Cl.$^7$ .............................. B60G 9/02; B60G 17/005
(52) U.S. Cl. .................................... 280/124.111; 280/755
(58) Field of Search .................................... 280/754, 755, 280/124.11, 124.112, 124.113, 124.106

(56) References Cited

U.S. PATENT DOCUMENTS

| 3,077,952 | * | 2/1963 | Neises | 280/124.112 |
| 3,171,556 | * | 3/1965 | Brekelbaum et al. | 280/124.112 |
| 3,976,302 | * | 8/1976 | Hammarstrand | 280/124.112 |
| 4,152,004 | * | 5/1979 | Schroder | 280/124.112 |
| 4,264,014 | * | 4/1981 | Hogg et al. | 280/754 |
| 4,344,497 | * | 8/1982 | Rathi et al. | 280/124.112 |
| 5,639,119 | * | 6/1997 | Plate et al. | 280/754 |
| 5,947,516 | * | 9/1999 | Ishikawa | 280/755 |

FOREIGN PATENT DOCUMENTS

| 1393215 | 5/1975 | (GB) . |
| 58-167215 | 10/1983 | (JP) . |
| 58-211903 | 12/1983 | (JP) . |
| 58-214406 | 12/1983 | (JP) . |
| 06-106930 | 4/1994 | (JP) . |

* cited by examiner

*Primary Examiner*—Peter C. English
(74) *Attorney, Agent, or Firm*—McDermott, Will & Emery

(57) ABSTRACT

A steering rear axle (5) of a fork lift truck is swingable about a longitudinal swing shaft (9). Even with an ignition key (89) on, if an operation switch (88) is off, an electromagnetic switch valve (83) is de-energized, holding a port-connecting valve position (C) allowing hydraulic oil to be supplied from a hydraulic line (79) via the electromagnetic switch valve (83) and a hydraulic line (49) to a driving hydraulic cylinder (31), so that a slider (23) abuts on a stopper member (19), restricting a swing action of the steering axle (5). With the operation switch (88) turned on, the electromagnetic switch valve (83) is energized, having a port-connecting valve position (D) interrupting a hydraulic oil supply to the driving hydraulic cylinder (31), causing the slider (23) to depart from the stopper member (19), enabling the swing action of the steering axle (5).

3 Claims, 13 Drawing Sheets

SYSTEM AND METHOD FOR SWING RESTRICTION OF REAR AXLE OF INDUSTRIAL VEHICLE

BACKGROUND OF THE INVENTION

The present invention relates to a rear axle swing restriction system and a rear axle swing restriction method. More specifically, the invention relates to a system and a method for swing restriction of a rear axle of an industrial vehicle, such as a fork lift truck, including a front axle of a rigid axle type and a rear axle of a swing axle type, in which the rear axle is operatively connected relative to a vehicle body at a central part thereof in a transverse direction of the vehicle, so that it is vertically swingable about the connected part relative to the vehicle body, and which has a stopper mechanism arranged between the rear axle and the vehicle body, for restricting an allowable range of the vertical swing.

There is disclosed in Japanese Patent Application Laid-Open Publication No. 6-106930 a fork lift truck as a vehicle including a front axle of a rigid axle type and a rear axle of a swing axle type. FIG. 1 is a front view of the rear axle, partly in section. Left and right rear wheels 1 are rotatably supported on left and right knuckle spindles 3, respectively, and the knuckle spindles 3 are operatively connected by left and right king pins 7 to both ends of steering axle 5 as the rear axle in concern.

The steering axle 5 has at a transversely central part thereof a swing shaft 9 provided therethrough in a longitudinal direction of the vehicle. The swing shaft 9 is operatively supported at its longitudinal ends with a pair of brackets 13 hung from underside of a vehicle body 11, so that left and right portions of the steering axle 5 are vertically swingable relative to the vehicle body 11, about a center of the swing shaft 9 as a swing center S, with effects such as a prevention of a floating of driving front wheels in travel on an undulating road or the like, permitting an improved ride feeling to be comfortable while traveling.

The vehicle body 11 has under left and right sides thereof a pair of stopper bolts 15 downardly projecting therefrom. On the other hand, the steering axle 5 has at corresponding locations thereon a pair of pads 17 for receiving lower ends of the stopper bolts 15, as they are either brought into abutment thereon, to thereby restrict an allowable range of the swing of the steering axle 5 relative to the vehicle body 11.

While the steering axle 5 swings within the allowable range, causing neither stopper bolt 15 to abut on pad 17, the vehicle body 11 is supported at three points defining a reverse triangle, i.e. at the left and right front wheels and the swing shaft 9, so that the fork lift truck usually travels like a tricycle that has a center of gravity within a triangle defined by a single front wheel and a pair of rear wheels.

In general, the fork lift truck is kept from tumbling when its body leans within a limit of floor inclination, and has "a stability against the tumbling in correspondence to an inner region of a triangular plane defined by support points of the body" (hereafter "vehicle body stability" or "stability"). The wider the region is, the greater the stability becomes.

The fork lift truck in concern however has a mast, which may have a significant lift height and may serve for carrying a heavy load lifted at a maximum height, with a significant rearward tilt, shifting a center of gravity of the vehicle body 11 toward the swingable rear axle 5. As the center of gravity moves rearward, the reverse triangle has a decreased transverse allowance for the stability, resulting in a reduced capacity.

The fork lift truck may travel at an accelerated speed on a flat road, with a "stableness". The stableness of travel is subjected to the three-point support system, and may be kept under a potential level. However, all the road is not flat.

SUMMARY OF THE INVENTION

The present invention has been achieved with such points in view.

It therefore is an object of the invention to provide a system and a method for swing restriction of a rear axle of a vehicle, permitting an increased vehicle body stability such as when handling a load and an enhanced stableness of travel such as at an accelerated speed, allowing for a comfortable ride feeling such as on an undulating road.

To achieve the object, an aspect of the invention provides a system for swing restriction of a rear axle of a vehicle in which the rear axle is operatively connected at a transversely central part thereof to a vehicle body and vertically swingable about the connected part relative to the vehicle body and which has a stopper mechanism interposed between the rear axle and the vehicle body for restricting a range of the vertical swing, wherein the system comprises the stopper mechanism adapted to be operable in a swing restricting state thereof for restricting a swing action of the rear axle relative to the vehicle body and in a swing enabling state thereof for enabling the swing action and to be normally held in the swing restricting state, and a restriction canceler for operating the stopper mechanism to cancel the swing restricting state to enter the swing enabling state.

Another aspect of the invention provides a method for swing restriction of a rear axle of a vehicle in which the rear axle is operatively connected at a transversely central part thereof to a vehicle body and vertically swingable about the connected part relative to the vehicle body and which has a stopper mechanism interposed between the rear axle and the vehicle body for restricting a range of the vertical swing, wherein the method comprises the steps of normally holding the stopper mechanism in a swing restricting state thereof for restricting a swing action of the rear axle relative to the vehicle body, and operating the stopper mechanism to have a swing enabling state thereof for enabling the swing action, as necessary.

According to those aspects of the invention, a stopper mechanism is normally kept in its swing restricting state, restricting a swing action of a rear axle relative to a vehicle body, permitting an improved stability of the vehicle body, such as for a load handling service, and an improved stableness of travel at a high speed. Further, such as when traveling an undulating road, the stopper mechanism may be operated to cancel the swing restriction, to enter its swing enabling state for enabling the swing action of the rear axle relative to the vehicle body, permitting an enhanced ride feeling due such as to an avoided lifting of front drive wheel.

BRIEF DESCRIPTION OF THE ACCOMPANYING DRAWINGS

The above and further objects and novel features of the invention will more fully appear from the following detailed description when the same is read in conjunction with the accompanying drawings, in which.

Figure 12:
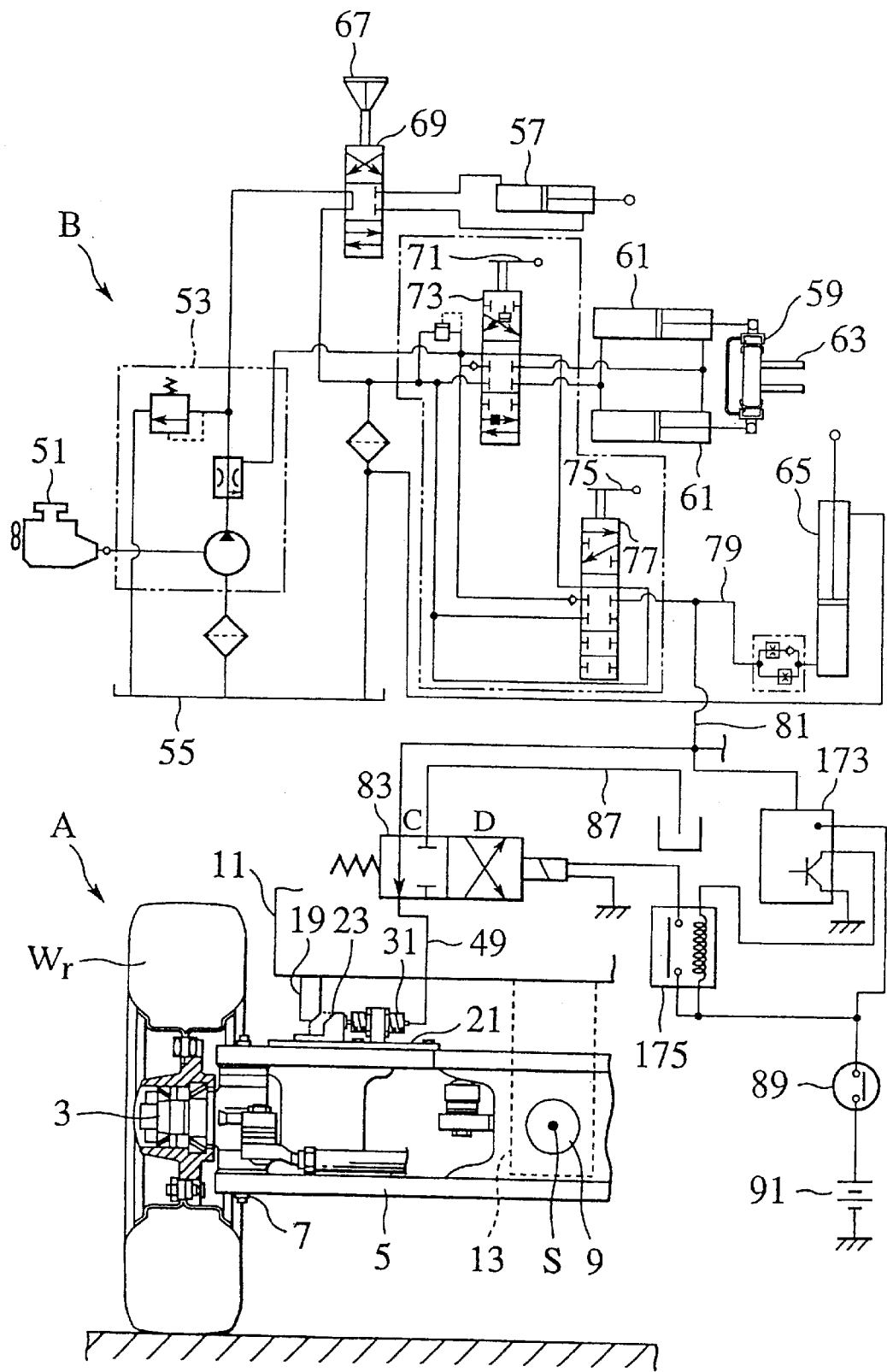
Figure 13:
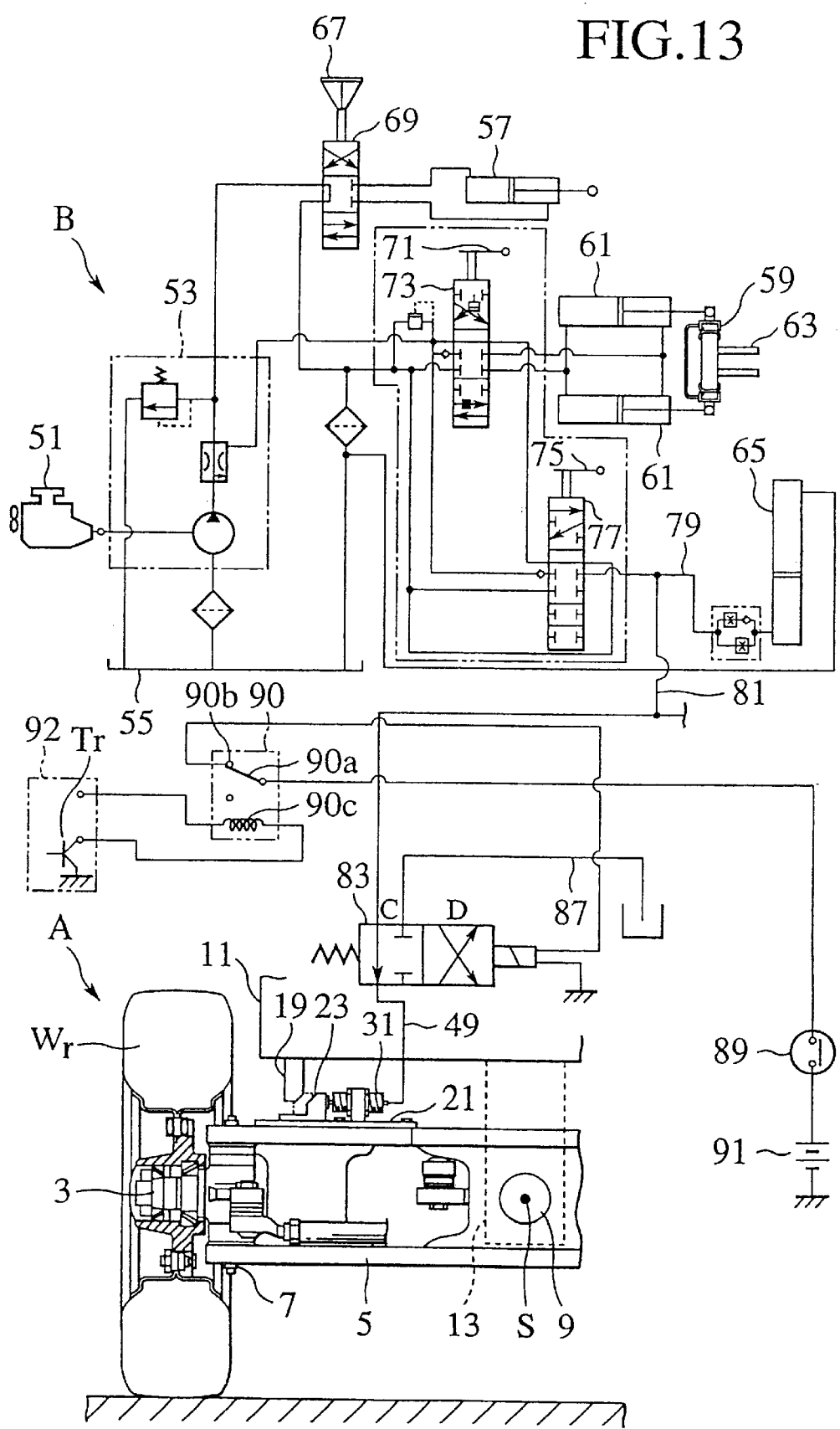

FIG. 12 is a combination of a front sectional view of a rear axle swing restriction system and a circuit diagram of an associated hydraulic system of a fork lift truck in accordance with another embodiment of the invention; and FIG. 13 is a combination of a front sectional view of a rear axle swing restriction system and a circuit diagram of an associated hydraulic system of a fork lift truck in accordance with another embodiment of the invention.

DETAILED DESCRIPTION OF THE PREFERRED EMBODIMENTS

There will be detailed below the preferred embodiments of the invention with reference to the accompanying drawings. Like members are designated by like reference characters.

Figure 1:
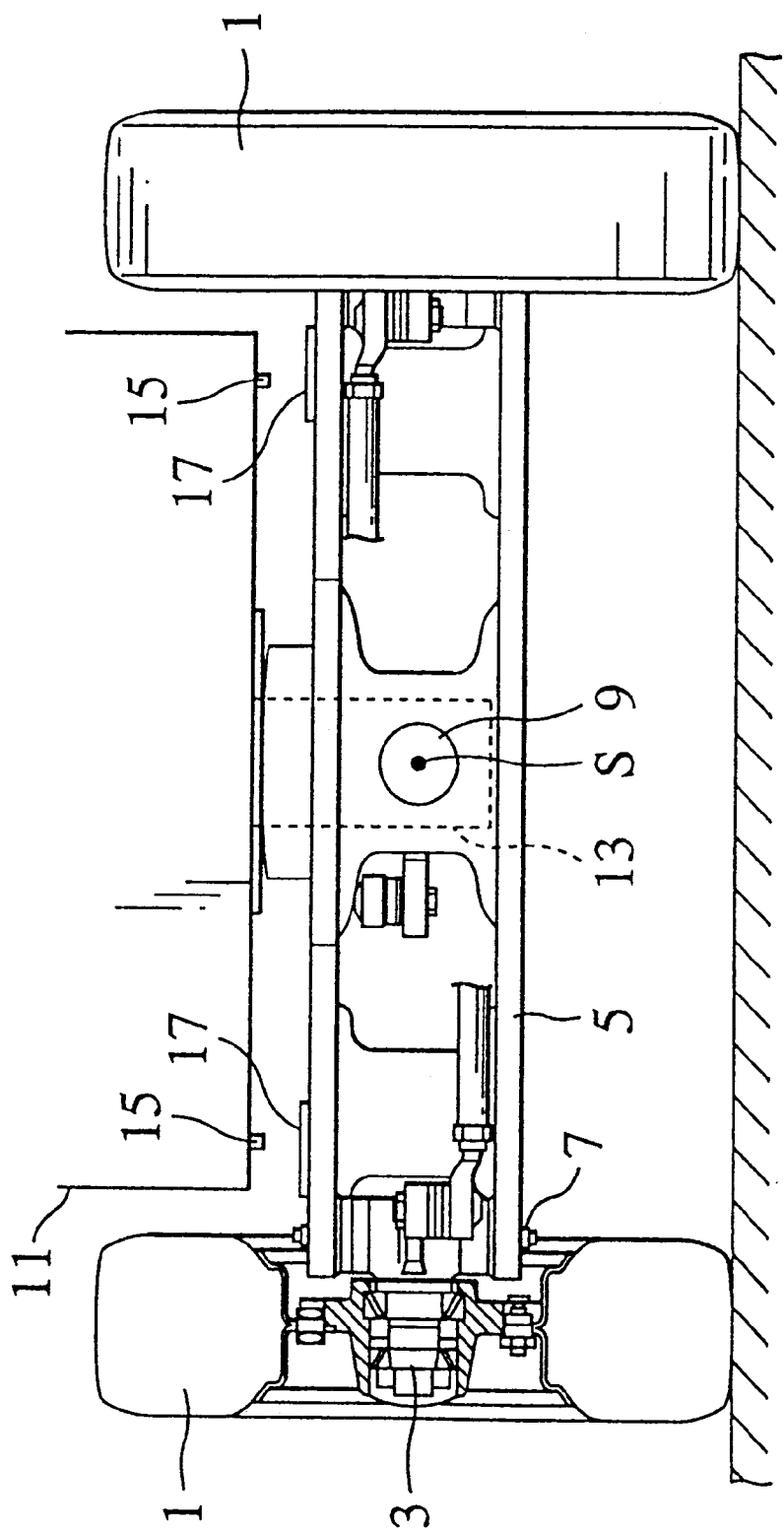
FIG. 1 is a front view, partly in section, of an essential portion of a conventional fork lift truck, including a swingable rear axle.
Figure 2:
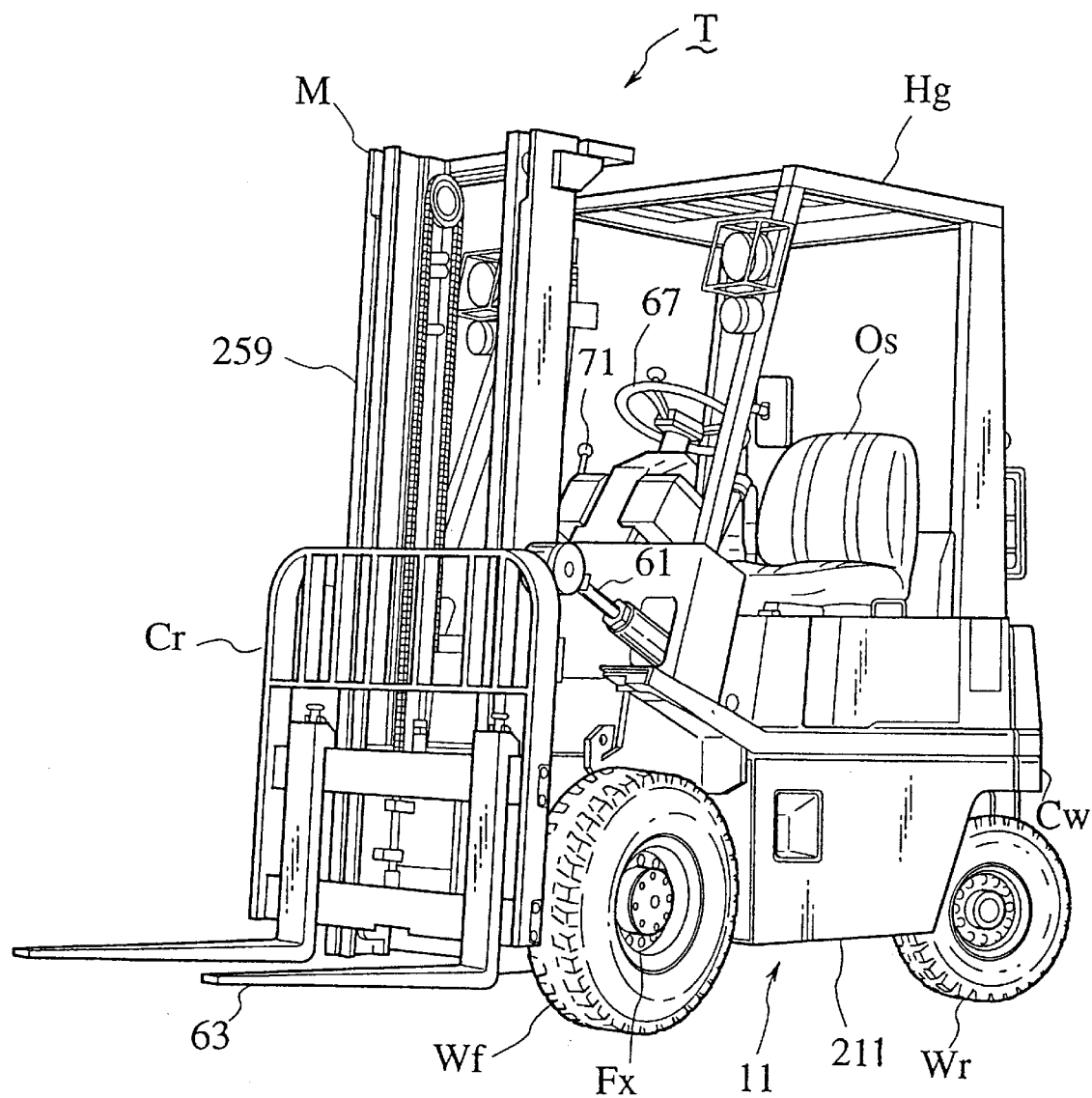
FIG. 2 is a perspective view of a fork lift truck including a rear axle swing restriction system according to an embodiment of the invention, as it is equipped with a two-stage mast.
Figure 3:
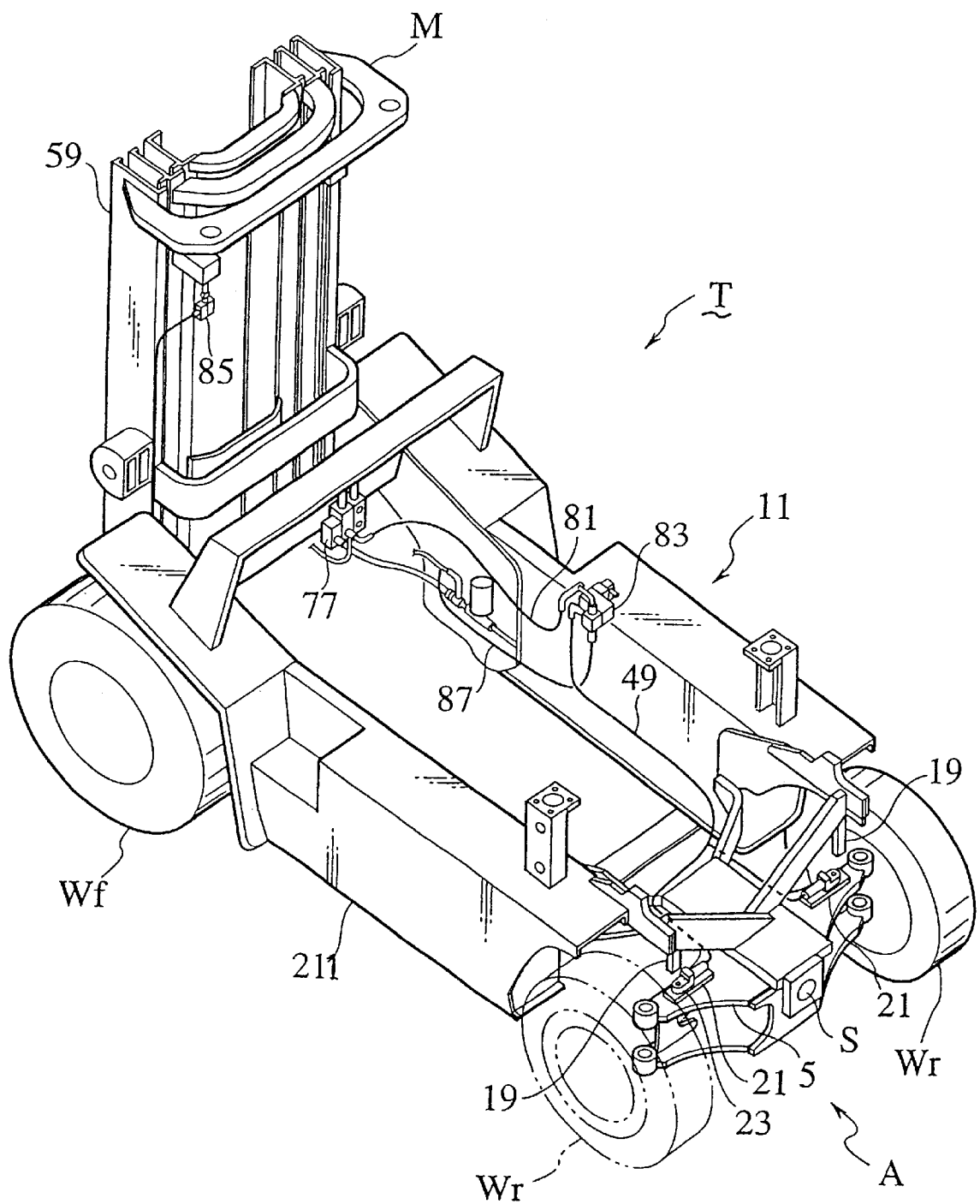
FIG. 3 is a perspective view, partly in section, of an essential portion of the fork lift truck of FIG. 2, as it is equipped with a three-stage mast.
Figure 4:
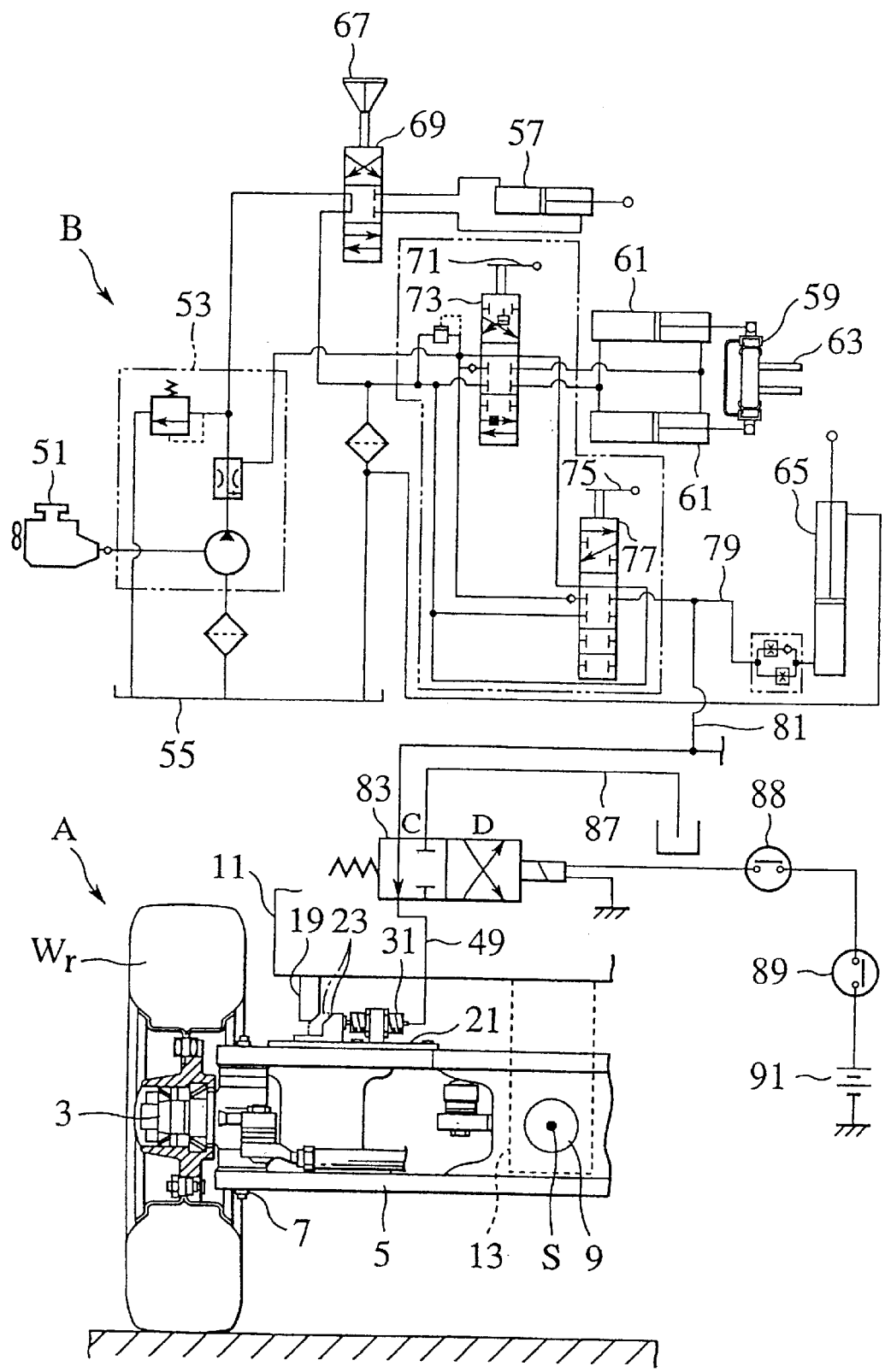
FIG. 4 is a combination of a front sectional view of the rear axle swing restriction system and a circuit diagram of an associated hydraulic system of the fork lift truck of FIG. 3.

FIGS. 2 and 3 show a fork lift truck T including a rear axle swing restriction system A (FIG. 3) according to a first embodiment of the invention. FIG. 4 is a combination of a front sectional view of a left half of the swing restriction system A and a circuit diagram of an associated hydraulic system B in the fork lift truck T.

The fork lift truck T comprises a vehicle body 11 having a counter weight Cw at a rear end thereof, a front axle Fx of a rigid axle type fixed to a front portion of the vehicle body 11, a pair of front drive wheels Wf operatively interconnected by the front axle Fx, a steering rear axle 5 of a swing axle type suspended from a rear portion of the vehicle body 11, a pair of rear steering wheels Wr operatively interconnected by the steering rear axle 5, and a full-free lift mast M of a two stage type 259 (FIG. 2) or three stage type 59 (FIG. 3) supported by a front end of the vehicle body 11. The vehicle body 11 includes a chassis 211, and has mounted thereon an operator's seat Os, a head guard Hg, drive torque, electric power and hydraulic (and/or pneumatic) sources such as an engine 51, a battery and a hydraulic pump (and/or an air suction line), electric and fluid circuitry, and various controls, detectors, instruments and operation members such as power steering wheel 67, a tilt control lever 71, a lift control lever, etc. The mast M is provided with a carriage Cr for carrying a pair of forks 63 or other attachments, and adapted to tilt by a pair of left and right tilt cylinders 61, lift and lower and/or transversely shift the carriage Cr.

A stopper member 19 of a square bar form is integrally provided on a lower surface near each transverse end of the vehicle body 11 and downwardly projects toward the steering rear axle 5. A base plate 21 is fixed to the steering axle 5, on an upside region thereof opposing the stopper member 19, and has mounted thereon a slider 23 as a swing restriction member slidable in a transverse direction of the vehicle body 11.

Figure 5:
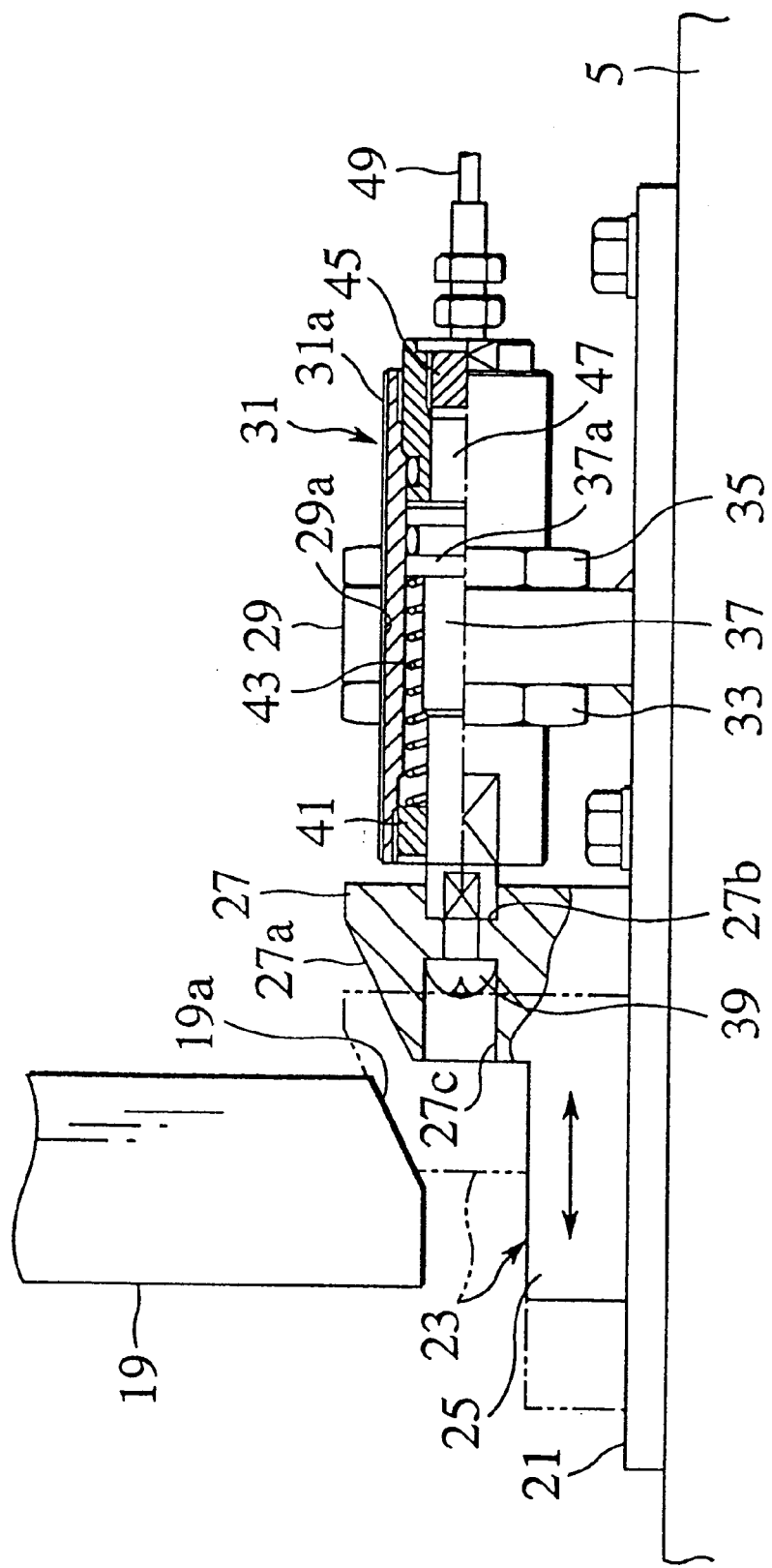
FIG. 5 is an enlarged side view, partly in section, of an essential portion of the rear axle swing restriction system of FIG. 4.

The slider 23 has a sliding part 25 slidable on the base plate 21 in parallel to the base plate 21, as illustrated in FIG. 5. A lower end of the stopper member 19 is brought into abutment on an upper surface of the sliding part 25, thereby restricting an allowable range of a swing action of the steering axle 5 relative to the vehicle body 11. The slider 23 has an upwardly projecting swing restricting part 27 at a right end of the sliding part 25 in the figure. The swing restricting part 27 is formed with a tapered face 27a at an upper left corner thereof facing the stopper member 19. The stopper member 19 also has a tapered face 19a formed at a lower right corner thereof in parallel to the tapered face 27a of the swing restriction part 27 of the slider 23. The swing action of the steering axle 5 is restricted relative to the vehicle body 11, as the tapered faces 27a, 19a are brought into abutment onto each other.

A support bracket 29 stands on the base plate 21, opposite to the stopper member 19 relative to the swing restriction part 27 of the slider 23. The support bracket 29 has a screw hole 29a formed therethrough in the transverse direction. A slider-driving hydraulic cylinder 31, which has a male thread 31a formed thereon, is screwed in the screw hole 29a and fixed to the support bracket 29 with a pair of fastening nuts 33 and 35 applied from both sides of the bracket 29.

The hydraulic cylinder 31 has a piston rod 37 inserted therein. The piston rod 37 projects at its front end toward the slider 23, and the projecting end is fitted in a recess 27b formed in the swing restricting part 27 of the slider 23. In opposition thereto, a screw insertion hole 27c is formed in the swing restriction part 27, and a screw 39 inserted therein is screwed into the front end of the piston rod 37, which is thus fixed to the slider 23.

The piston rod 37 is normally urged rightwards in the figure with a compressed spring 43 interposed between a flange 37a formed at a right end of the rod 37 and a spring sear 41, and is controlled to move leftwards in the figure against a resilient force of the spring 43 with hydraulic oil supplied through a hydraulic line 49 to a hydraulic chamber 47 between the flange 37a and a cap 45. In accordance with the leftward movement of the piston rod 37, the slider 23 is driven or actuated to slide from a swing enabling position (depicted by solid line) to a swing restricting position (depicted by two-dot chain line). In this position of the slider 23, the swing restricting part 27 intervenes between the stopper member 19 and the steering axle 5, to restrict a swing action of the steering axle 5 relative to the vehicle body 11.

In the hydraulic system B, a hydraulic pump 53 to be driven from the engine 51 serves to deliver hydraulic oil from an oil reservoir or tank 55 along various hydraulic circuits to respective hydraulic cylinders such as power steering cylinder 57, each tilt cylinder 61 for a longitudinal tilt action of the mast 59, and a lift cylinder 65 for lifting and lowering a mast member carrying the carriage Cr together with the forks 63.

Some hydraulic circuits includes manually controllable switch valves: e.g. on a circuit for the power steering cylinder 57, there is installed a switch valve 69 operable for a (port-connection switching) valve action by the power steering wheel 67; for the tilt cylinder 61, a switch valve 73 operable by the tilt control lever 71, and for the lift cylinder 65, a switch valve 77 operable by a lift control lever 75.

The switch valve 77 is connected to the lift cylinder 65 by a hydraulic line 79, which is connected via a branch line 81 to an electromagnetic switch valve 83, which is selectively connected to a drain line 87 and to the hydraulic line 49 leading to the hydraulic cylinder 31 for driving to actuate the slider 23. The electromagnetic switch valve 83 normally has a port-connecting valve position C, where it interconnects the branch line 81 from the system B with the line 49 to the slider-driving cylinder 31, as in FIG. 4, conducting hydraulic oil via the lines 81, 49 to this cylinder 31. When powered on, the electromagnetic switch valve 83 is switched to have a switched port-connecting valve position D, where it interconnects the hydraulic line 49 with the drain line 87, rendering the cylinder 31 inoperative for slider actuation.

The stopper member 19, the slider 23 and the slider-driving hydraulic cylinder 31 cooperatively constitute a stopper mechanism, which has a swing restricting state when the electromagnetic switch valve 83 is in the position C, and has a swing enabling state when the electromagnetic switch valve 83 is in the position D.

The electromagnetic switch valve 83 has an electric power or control line connected to a battery 91 via an operation switch 88 and an ignition key 89 as a canceling means. The operation switch 88 is a manual press type to be set and reset by an operator, and normally has a reset state (an off state). With the ignition key 89 turned on, if the operation switch 88 is set (to an on state), then the electromagnetic switch valve 83 is energized, having the valve position D.

There will be described below actions of the rear axle swing restriction system A. As the ignition key 89 is turned on, the engine 51 is started, operating the hydraulic pump 53 to deliver hydraulic oil to respective connected circuits. As the operation switch 88 is in the reset state (the off state), the electromagnetic switch valve 83 is not powered and has the valve position C, conducting hydraulic oil from the hydraulic line 79 to the hydraulic cylinder 31.

Under this condition, if the switch valve 77 is operated by the lift control lever 75 for e.g. a load handling service using the forks 63, then hydraulic oil from the hydraulic pump 53 is supplied to the lift cylinder 65 via the hydraulic line 79, and is branched therefrom via the branch line 81 to the electromagnetic switch valve 83 and in turn to the hydraulic line 49 to the hydraulic cylinder 31, acting on the piston rod 37 of FIG. 5, which is thus actuated to the left in FIG. 5 against a resilient force of the spring 43.

Accordingly, the slider 23 is actuated to shift from the position of solid line to the position of two-dot chain line, having the tapered face 27a thereof brought into abutment on the tapered face 19a of the stopper member 19 (like action occurs in a left half of the system A), effectively restricting a swing action of the steering axle 5, (having a trapezoid region or a rearwardly extended reverse triangle region for stability) keeping the vehicle body 11 from rolling, permitting a stable handling service to be rendered, even when the mast 59 tilts with a heavy load at a maximum lift height.

The fork lift truck T may travel on an undulating or snaking road or obliquely go up along a sloping land, with the mast 59 lowered. In such a case, the operation switch 88 is set (turned on) to power on the electromagnetic switch valve 83, setting this valve 83 in the position D, and hydraulic oil of the line 79 in the hydraulic system B is not supplied to the hydraulic cylinder 31 in the swing restriction system A, allowing the spring 43 to push the piston rod 37 to a retreat position. Therefore, the slider 23 has the swing-enabling solid-line position in FIGS. 4 and 5, enabling the steering axle 5 to swing about a swing center S relative to the vehicle body 11 within a predetermined angle range, permitting an improved ride feeling such as with an eliminated floating of a front (drive) wheel on the undulating road, etc.

Like this, the operation switch 88 may be operated, as necessary, to have such a condition with the steering axle 5 disabled to swing, to achieve an improved stableness of travel such as on an undulating road.

As hydraulic oil is common between the lift cylinder 65 and the slider-driving cylinder 31, this cylinder 31 does not need a dedicated supply circuit therefor, with an eliminated complexity, allowing for a low cost and a competent vehicle body stability and travel stableness.

Further, normally or when de-energized, the electromagnetic switch valve 83 has the valve position C restored for swing restriction of the steering axle 5, with an ensured effect. Such swing restriction is effected, as necessary, in free of inconveniencies due to a failure of necessary restriction, even when suffering from an eventual trouble of an associated electric system, such as a disconnection in wiring harness, an insufficient electric contact of the operation switch 88 or a defect of a solenoid in the electromagnetic switch valve 83.

The operation switch 88 serving as a restriction canceler may preferably be replaced by a lift detecting switch 85 (see FIG. 3) to be turned off when the mast 59 exceeds a predetermined lift height. In this case, the lift detecting switch will be kept in an on state (i.e. a conductive close-state) before the mast 59 exceeds the predetermined lift height, holding the electromagnetic switch valve 83 in the valve position D, so that the slider 23 as a swing restriction member has the swing enabling position.

On the contrary, if the mast 59 exceeds the predetermined lift height, the lift detecting switch detects an exceeding height and has an off state (i.e. a non-conductive open-state), and the electromagnetic switch valve 83 has the valve position C, and the swing restriction member 23 takes the swing restricting position, permitting a load handling service with an improved vehicle body stability.

Figure 6:
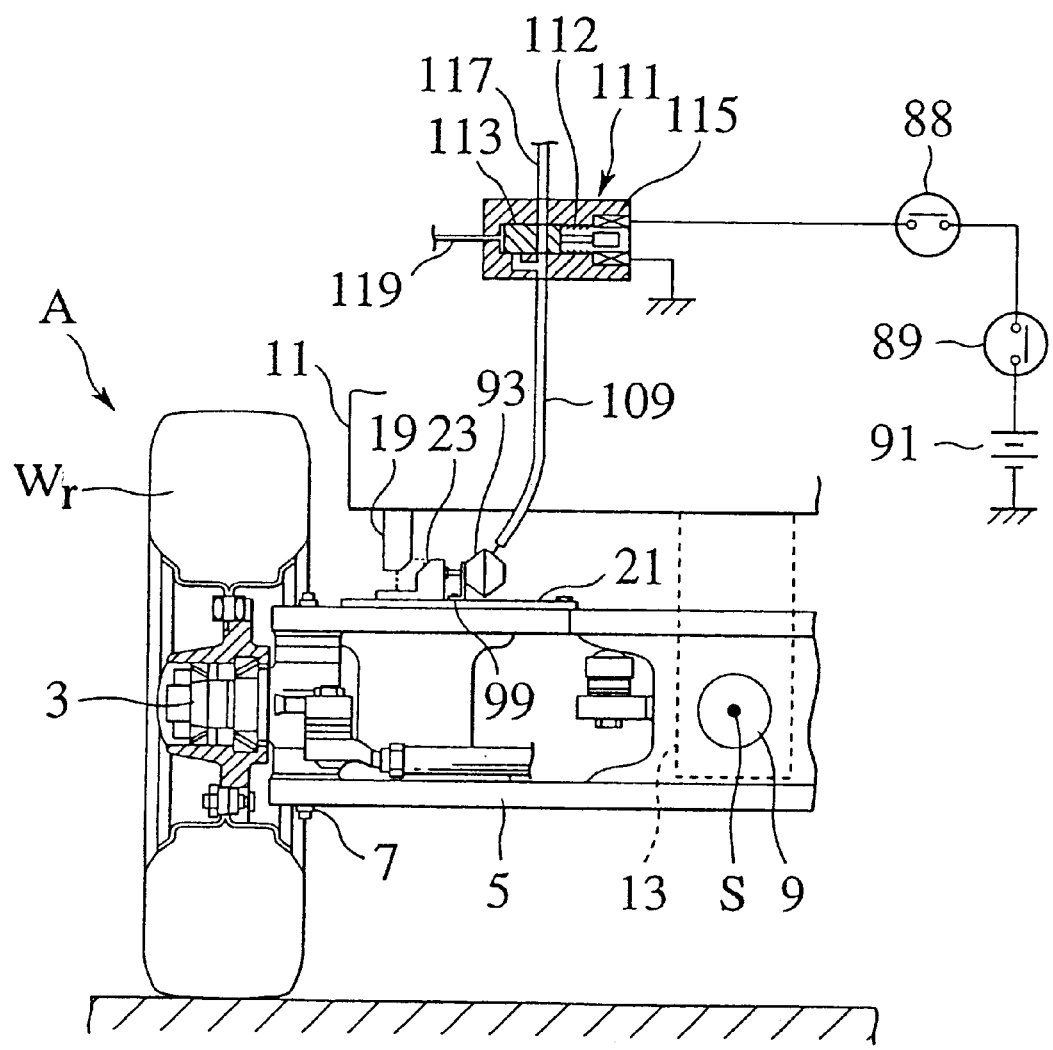
FIG. 6 is a combination of a front sectional view and an associated hydraulic circuit diagram of a rear axle swing restriction system of a fork lift truck in accordance with another embodiment of the invention.
Figure 7:
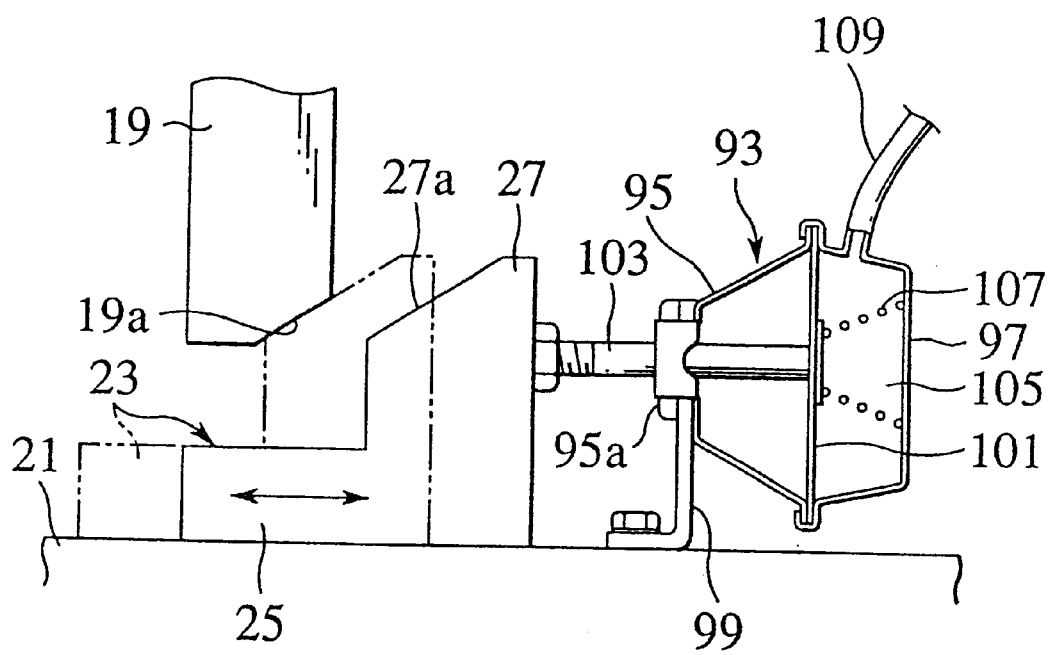
FIG. 7 is an enlarged side view, partly in section, of an essential portion of the rear axle swing restriction system of FIG. 6.

FIG. 6 shows a second embodiment of the invention, and FIG. 7 is a detail of an essential portion. This embodiment employs, as a drive means substituting for the hydraulic cylinder 31 in the embodiment of FIG. 4, a negative pressure valve 93 operable with a negative suction pressure of an engine mounted on a vehicle body 11.

The negative pressure valve 93 has a valve casing comprising a left first cover 95 and a right second cover 97. The first cover 95 is fixed to a base plate 21 through a bracket 99. An elastically deformable diaphragm valve 101 is interposed between the first and second covers 95 and 97, and fastened to a right end of an acting rod 103 which constitutes a valve body together with the diaphragm valve 101. A left end of the rod 103 is screwed to be fixed to a swing restricting part 27 of a slider 23. The rod 103 is slidable relative to a boss portion 95a of the first cover 95.

A compressed spring 107 for normally leftwardly urging the diaphragm valve 101 is accommodated in a pressure chamber 105 between the second cover 97 and the diaphragm valve 101. An air line 109 is connected at one end thereof to the pressure chamber 105 and at another end thereof to a negative pressure switch valve 111.

The negative pressure switch valve 111 has a valve member 113 slidably fitted in a valve chamber and laterally slidable in the drawing (along an axis of the valve chamber), a compressed spring 112 for normally leftwardly urging the valve member 113, and an electromagnetic coil 115 to be energized for forcing the valve member 113 to the right from a normal position shown in FIG. 6. The valve chamber of the switch valve 111 is connected to an atmospheric air line 117 for introducing an atmospheric pressure from an air cleaner of intake air of the engine, and to a negative pressure air line 119 for introducing a negative pressure (of suction air) from the engine. Normally, as the valve member 113 is held in the position shown in FIG. 6, the air line 109 communicates with the atmospheric air line 117 and has an atmospheric pressure. If the electromagnetic coil 115 is energized, the valve member 113 is forced to the right, and the air line 109 communicates with the negative pressure air line 119, thus having a negative pressure.

The electromagnetic coil 115 is electrically connected via an operation switch 88 and an ignition key 89 to a battery 91.

Under a condition that the engine is started with the ignition key 89 turned on, if the operation switch 88 is left in an off state, the valve member 113 is held at the position of FIG. 6, an atmospheric pressure is supplied to the air line 109 from the atmospheric air line 117 and acts on the negative pressure valve 93, causing the rod 103 to push the slider 23 to the left so that the slider 23 has a position of two dot chain line for restricting a swing action of a steering axle 5, permitting a load handling service with an improved vehicle body stability.

When the operation switch 88 is turned on, energizing the electromagnetic coil 115, the valve member 113 is moved to the right from the position shown in FIG. 6, having the negative pressure air line 119 communicating with the air line 109, supplying a negative pressure to the pressure chamber 105 of the negative pressure valve 93, causing the rod 103 to pull back the slider 23 to the right from the two-dot chain line position, against a resilient force of the spring 107, so that the slider 23 has a position of solid line, enabling a swing action of the steering axle 5 relative to the vehicle body 11, permitting an enhanced riding comfort such as on an undulating road.

In the second embodiment (FIGS. 6–7) also, the operation switch 88 may preferably be replaced by a lift detecting switch to be turned off when a mast exceeds a predetermined lift height.

In this embodiment, normally or when the electromagnetic coil 115 is de-energized, an atmospheric pressure is supplied to the negative pressure valve 93 to restrict a swing action of the steering axle 5, with an ensured effect. Such swing restriction is effected, an necessary, in free of inconveniencies due to a failure of necessary restriction, even when suffering from an eventual trouble of an associated electric system, such as a disconnection in wiring harness, like the embodiment of FIG. 4.

Figure 8:
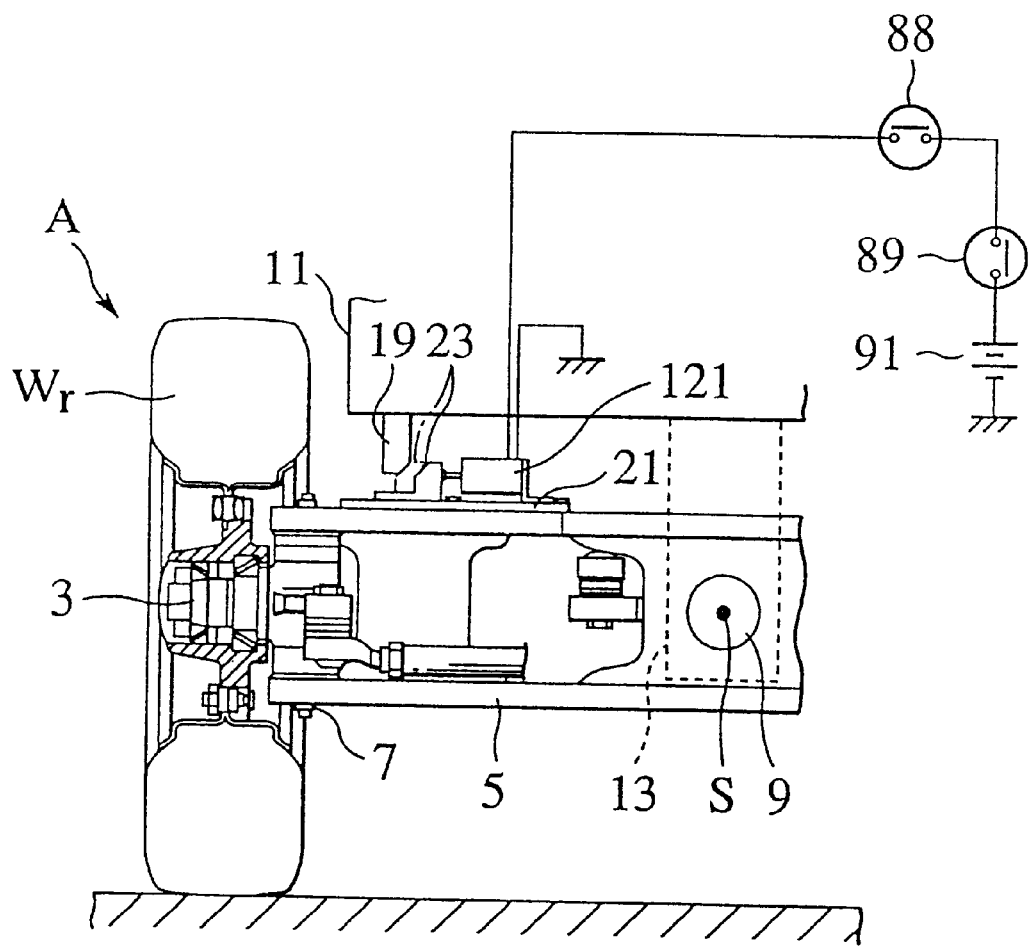
FIG. 8 is a combination of a front sectional view and an associated hydraulic circuit diagram of a rear axle swing restriction system of a fork lift truck in accordance with another embodiment of the invention.
Figure 9:
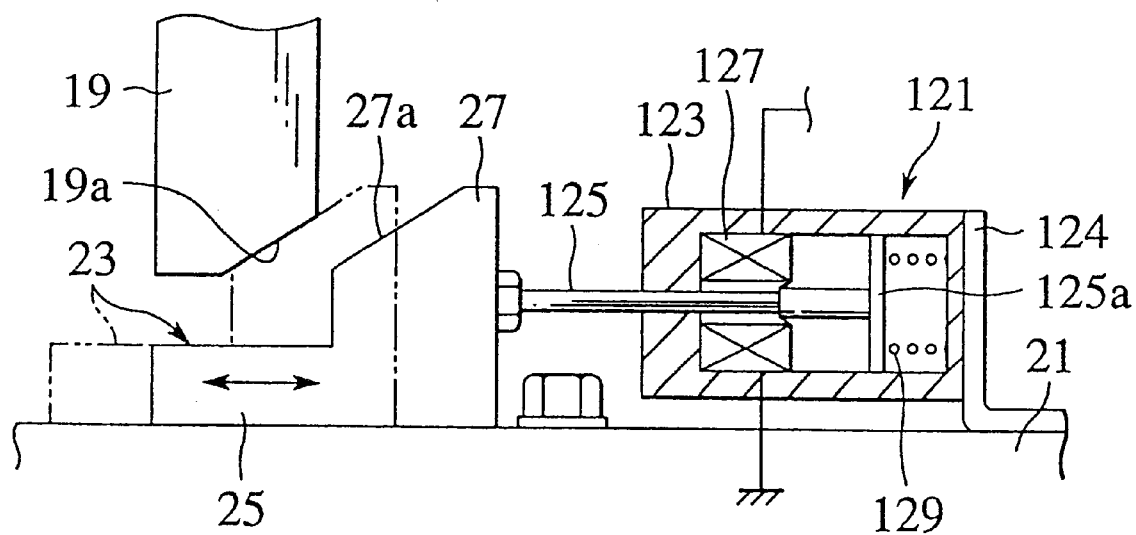
FIG. 9 is an enlarged side view, partly in section, of an essential portion of the rear axle swing restriction system of FIG. 8.

FIG. 8 shows a third embodiment of the invention, and FIG. 9 is a detail of an essential portion. This embodiment employs an electromagnetic actuator 121 as a drive means substituting for the hydraulic cylinder 31 in the embodiment of FIG. 4. The electromagnetic actuator 121 comprises a housing 123 fixed at a right end thereof to a base plate 21 through a bracket 124, and an acting plunger 125 fitted in a chamber of the valve housing 123 and movable in a lateral direction in the drawing (along an axis of the chamber). The plunger 125 extends through a left wall of the housing 123, and is screwed and fixed to a swing restricting part 27 of a slider 23.

The housing 123 of the actuator 121 has in the chamber an electromagnetic coil 127 surrounding an outer circumference of the plunger 125, and a compressed spring 129 for normally urging the plunger 125 to the left, which spring 129 is interposed between a right wall of the housing 123 and a magnetic spring receiver 125a attached to a right end of the plunger 125. To the electromagnetic coil 127 is connected a serial connection of an operation switch 88, an ignition key 89 and a battery 91, like the embodiment of FIG. 4. When the operation switch 88 is turned on, the electromagnetic coil 127 is energized to force the plunger 125 to the right against a resilient force of the spring 129 so that the slider 23 is shifted from a position of two dot chain line to a position of solid line, as illustrated in the figure.

In the third embodiment (FIGS. 8–9), under a condition that the engine has started with the ignition key 89 turned on, if the operation switch 88 is left in an off state, the electromagnetic coil 127 holds a de-energized state, and the slider 23 is set in the position of two dot chain line with a pushing force of the spring 129, thus restricting a swing action of a steering rear axle 5 relative to a vehicle body 11, allowing for a load handling service with an increased stability.

On the other hand, when the operation switch 88 is turned on, the electromagnetic coil 127 is energized and forces the plunger 125 backwards against a resilient force of the spring 129, pulling back the slider 23 from the position of two dot chain line to the position of solid line, thus enabling a swing action of the steering axle 5 relative to the vehicle body 11, allowing for an improved ride feeling such as on an undulating road.

In this embodiment also, the operation switch 88 may preferably be replaced by a lift detecting switch that turns off when a mast exceeds a predetermined lift height.

In this embodiment, the restriction to a swing action of the steering axle 5 is secured normally or when the electromagnetic coil 127 is de-energized. Such swing restriction is effected, as necessary, in free of inconveniencies due to a failure of necessary restriction, even when suffering from an eventual trouble of an associated electric system, such as a disconnection in wiring harness, like the embodiment of FIG. 4.

Figure 10:
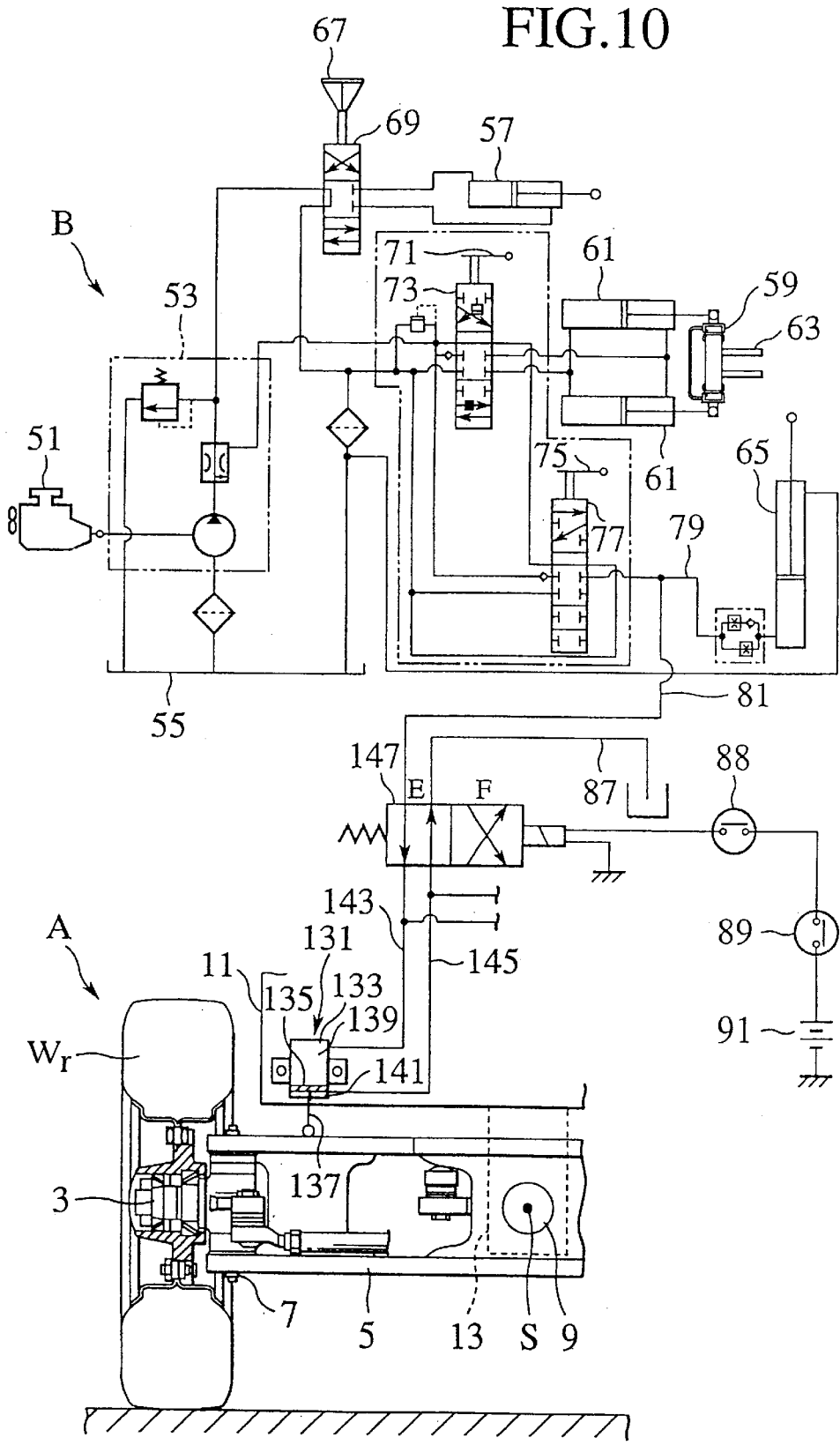
FIG. 10 is a combination of a front sectional view of a rear axle swing restriction system and a circuit diagram of an associated hydraulic system of a fork lift truck in accordance with another embodiment of the invention.

FIG. 10 shows a fourth embodiment of the invention, which employs a hydraulic cylinder 131 as a hydraulic stopper mechanism for restricting a swing action of a steering rear axle 5 relative to a vehicle body 11. The hydraulic cylinder 131 comprises a vertical cylinder body 133 fixed to the vehicle body 11, a piston 135 movable along an axis of the cylinder body 131, and a piston rod 137 attached to the piston 135. The piston rod 137 extends through a bottom of the cylinder body 133, toward a steering rear axle 5.

Inside of the cylinder body 133 is separated by the piston 135 into an upper oil chamber 139 and a lower oil chamber 141, which are connected by hydraulic lines 143 and 145 respectively to an electromagnetic switch valve 147. Normally or when de-energized, the electromagnetic switch valve 147 has a port-connecting valve position E, where it interconnects the hydraulic lines 143 and 145 with a hydraulic line 81 (branching from a hydraulic system B) and a drain line 87, respectively. When energized, the electromagnetic switch valve 147 has a switch port-connecting valve position F, where it interconnects the hydraulic line 143 with the drain line 87, and the hydraulic line 145 with the hydraulic line 81.

The steering rear axle 5 has an unshown right portion provided with another slider-driving hydraulic cylinder 131, which also has an upper oil chamber and a lower oil chamber connected to the hydraulic lines 143 and 145, respectively. Associated arrangement is analogous to that of FIG. 4.

In the fourth embodiment (FIG. 10), under a condition that an engine 51 has started with an ignition key 89 turned on, if an operation switch 88 is left in an off state, the electromagnetic switch valve 147 has the valve position E, and hydraulic oil from a hydraulic line 79 is supplied to the upper oil chamber 139 of the hydraulic cylinder 131, forcing the piston rod 137 to downwardly move, with its end abutting on the steering axle 5, thus restricting a swing action of the steering axle 5 relative to a vehicle body 11, allowing for a load handling service with an increased stability.

On the other hand, when the operation switch 88 is turned on, the electromagnetic switch valve 147 is energized and has the valve position F, and hydraulic oil from the hydraulic line 79 is supplied to the lower oil chamber 141 of the hydraulic cylinder 131, forcing the piston rod 137 to upwardly move, detaching from the steering axle 5, thus enabling the swing action of the steering axle 5 relative to the vehicle body 11, allowing for an improved ride feeling such as on an undulating road.

In this embodiment also, the operation switch 88 may preferably be replaced by a lift detecting switch that turns off when a mast 59 exceeds a predetermined lift height.

In this embodiment, normally or when de-energized, the electromagnetic switch valve 147 has the valve position E restored for supplying hydraulic oil to the upper oil chamber 139 to restrict a swing action, with an ensured effect. Such swing restriction is effected, as necessary, in free of inconveniencies due to a failure of necessary restriction, even when suffering from an eventual trouble of an associated electric system, like the embodiment of FIG. 4.

Figure 11:
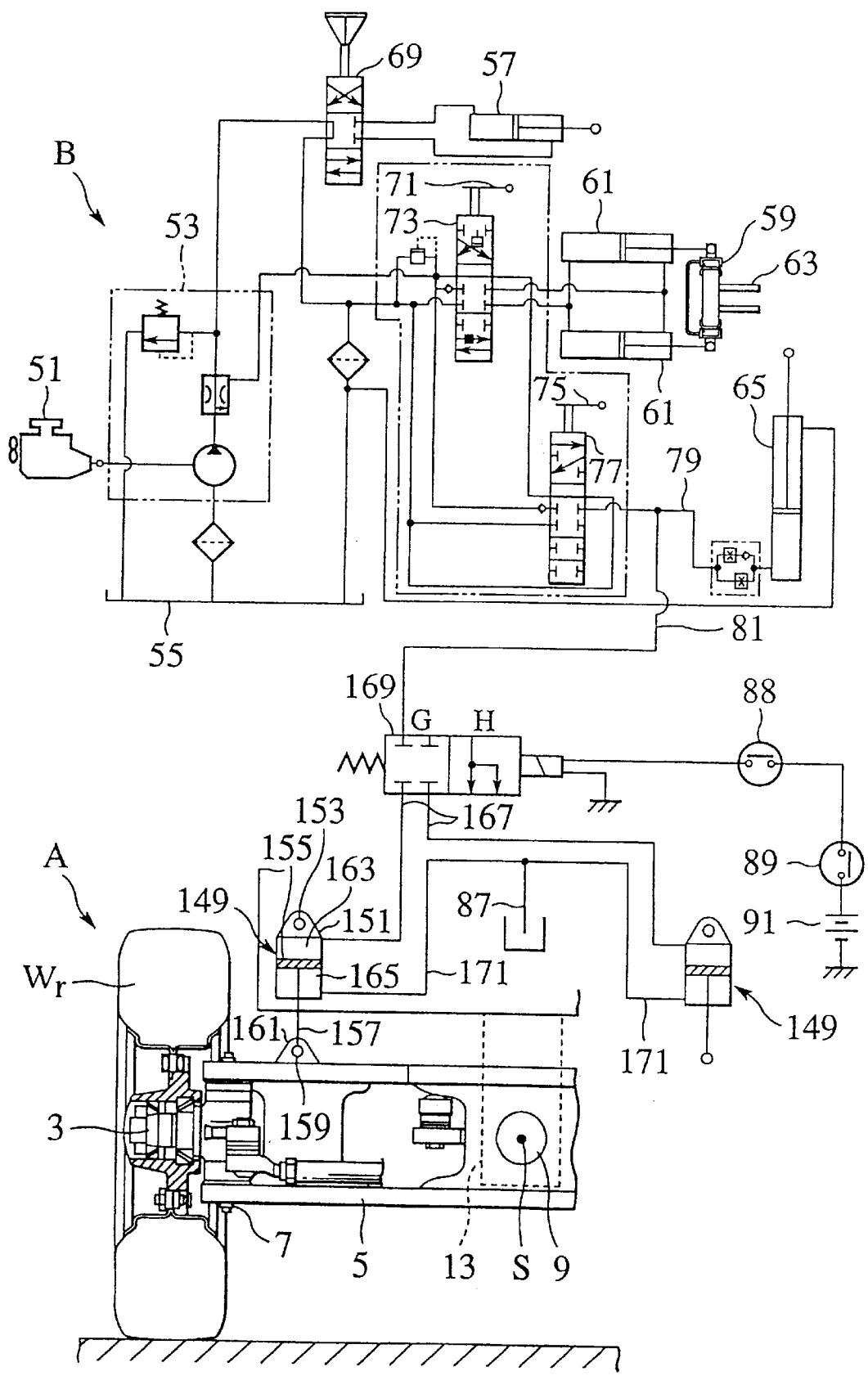
FIG. 11 is a combination of a front sectional view of a rear axle swing restriction system and a circuit diagram of an associated hydraulic system of a fork lift truck in accordance with another embodiment of the invention.

FIG. 11 shows a fifth embodiment of the invention, which employs a hydraulic cylinder 149 as a hydraulic or fluid-pressure stopper mechanism for restricting a swing action of a steering rear axle 5 relative to a vehicle body 11. Like the embodiment of FIG. 10, the hydraulic cylinder 149 is paired, and an analogous right cylinder 149 mating with the concerned left cylinder 149 is provided on an unshown right portion of the steering axle 5.

The hydraulic cylinder 149 comprises a vertical cylinder body 151 rotatably supported at its upper end relative to a vehicle body 11 via a pivot pin 153, a piston 155 movable along an axis of the cylinder body 151, and a piston rod 157 attached at its upper end to the piston 155. The piston rod 157 extends through a bottom of the cylinder body 151, toward the steering axle 5, and has its lower end rotatably connected via a pivot pin 159 to a bracket 161 on the steering axle 5.

Inside of the cylinder body 151 is separated by the piston 155 into an upper oil chamber 163 and a lower oil chamber 165. The upper oil chamber 163 of the concerned hydraulic cylinder 149 and that of the right hydraulic cylinder 149 are connected by a pair of left and right hydraulic lines 167 to an electromagnetic switch valve 169. The lower oil chamber 165 of the concerned hydraulic cylinder 149 and that of the right hydraulic cylinder 149 are connected by a pair of left and right hydraulic lines 171 to a drain line 87.

Normally or when de-energized, the electromagnetic switch valve 169 has a port-connecting valve position G, where it shuts off respective near ends of the left and right hydraulic lines 167, rendering the upper oil chamber 163 of each hydraulic cylinder 149 sealed in an oil-tight manner. When energized, the electromagnetic switch valve 169 has a port-connecting valve position H, where it interconnects the left and right hydraulic lines 167 with a hydraulic line 81 (branching from a hydraulic system B).

In the fifth embodiment (FIG. 11), under a condition that an engine 51 has started with an ignition key 89 turned on, if an operation switch 88 is left in an off state, the electromagnetic switch valve 169 has the valve position G, and the hydraulic lines 167 of the left and right hydraulic cylinders 149 are blocked, so that the piston 155 is kept in a fixed state, thus restricting a swing action of the steering axle 5 relative to the vehicle body 11, allowing for a load handling service with an increased stability.

On the other hand, when the operation switch 88 is turned on, the electromagnetic switch valve 169 is energized and has the valve position H, and hydraulic oil from the hydraulic line 79 acs on the respective upper oil chambers 163 of the left and right hydraulic cylinders 149, while the respective lower oil chambers 165 of the left and right hydraulic cylinders 149 are opened via the hydraulic lines 171 to the drain line 87, so that the cylinder body 151 and the piston rod 157 are forced to rotate respectively about the pivot pins 153 and 159 as their fulcrums, with a corresponding axial movement of the piston rod 157 relative to the cylinder body 151, thereby enabling a swing action of the steering axle 5 relative to the vehicle body 11, allowing for an improved ride feeling such as on an undulating road.

In this embodiment also, the operation switch 88 may preferably be replaced by a lift detecting switch that turns off when a mast 59 exceeds a predetermined lift height, like the embodiment of FIG. 4.

In this embodiment, normally or when de-energized, the electromagnetic switch valve 169 has the valve position G restored for blocking the respective upper oil chambers 163 to restrict a swing action, with an ensured effect. Such swing restriction is effected, as necessary, in free of inconveniencies due to a failure of necessary restriction, even when suffering from an eventual trouble of an associated electric system, such as a disconnection in a wiring harness.

FIG. 12 shows a sixth embodiment of the invention, which employs in place of the operation switch 88 in the first embodiment a combination of a pressure switch 173 having a switching transistor, and a relay 175 having a relay contact element operable with an actuator as a solenoid electrically connected in series to the switching transistor. The pressure switch 173 works with electric power supplied through a key switch line, for detecting an oil pressure in a hydraulic line 81 communicating with a hydraulic line 79 of a hydraulic system B, and turns off (i.e. the switching transistor is operated to an off state) with a detected oil pressure exceeding a predetermined pressure. The switching transistor is non-conductive in the off state, and conductive in an on state. With the pressure switch 173 on (i.e. when the switching transistor is restored to the on state), the relay 175 is adapted to be conductive (with the relay element actuated to a contact position by the actuator, as it is energized) so that an electromagnetic switch valve 83 can be energized by an operation of a key switch 89.

The pressure switch 173 has the on state when the oil pressure in the hydraulic line 81 (which is equivalent to a hydraulic pressure supplied through the hydraulic line 79 to a lift cylinder 65) is below the predetermined pressure, providing that the key switch 89 is turned on. As the relay 175 is on with the pressure switch 173 on, the electromagnetic switch valve 83 is energized and has a port-connecting valve position D, thereby enabling a swing action of a steering axle 5 relative to a vehicle body 11, permitting an improved ride feeling such as on an undulating road. In this respect, the pressure switch 173 and the relay 175 cooperate with each other to constitute a canceller that has an operating phase to render a stopper mechanism in a swing enabling state.

On the other hand, if the detected oil pressure in the hydraulic line 81 exceeds the predetermined pressure, the pressure switch 173 turns off in accordance with a concept suh that a load handling service should be on a way, and concurrently the relay 175 turns off, de-energizing the electromagnetic switch valve 83, which thus has a switched port-connecting valve position C, and like the embodiment of FIG. 4, hydraulic oil of the line 79 to the lift cylinder 65 is supplied to a slider-driving hydraulic cylinder 31, thus restricting a swing action of the steering axle 5 relative to the vehicle body 11, allowing for a load handling service with an improved vehicle body stability. In this respect, the canceller comprised of the pressure switch 173 and the relay 175 has a non-operating phase to render the stopper mechanism in a swing restricting state.

In the sixth embodiment (FIG. 12), swing restriction of the steering axle 5 is switched in accordance with a pressure of hydraulic oil supplied to the lift cylinder 65, i.e., depending on a load weight, irrespective of a lift height of a mast 59. In a fork lift truck, the steering axle 5 is thus subjected to swing restriction even when the truck travels with a weight of luggage. However, with an increased load on driving (front) wheels of the fork lift truck carrying the luggage, the driving wheels are prevented from slipping even on an undulating road, permitting a secured travel of the truck.

The pressure switch 173 and the relay 175 may substitute, in combination, for the operation switch 88 in a respective one of the embodiments of FIGS. 6, 8, 10 and 11.

FIG. 13 shows a seventh embodiment of the invention, which employs in place of the operation switch 88 in the embodiment of FIG. 4 a combination of a speed sensor 92 and a relay 90 between an ignition key 89 and an electromagnetic switch valve 83. The speed sensor 92 includes a switching transistor Tr adapted to be on (i.e. conductive) when a detected vehicle speed exceeds a preset vehicle speed. The relay 90 comprises a contact arm 90a normally in contact with an on contact 90b, and a coil 90c for actuating the contact arm 90a to have a switched position, where it is off (i.e. non-conductive). The coil 90c is electrically connected in series with the switching transistor Tr. If the detected vehicle speed is over the preset vehicle speed, an electric current is conducted through the switching transistor Tr and the coil 90c, which coil 90c is thus energized, actuating the contact arm 90a to detach from the contact 90b, so that the relay 90 turns off. The contact 90b is electrically connected to the electromagnetic switch valve 83. Associated arrangement in this embodiment is similar to that in the embodiment of FIG. 4.

In the seventh embodiment (FIG. 13), when the ignition key 89 is turned on, the electromagnetic switch valve 83 is energized with a current conducted through the relay 90, and has a valve position D, where it shuts hydraulic oil supply to a slider-driving hydraulic cylinder 31, causing a slider 23 to be shifted to a retreat position, canceling a restriction effect on a swing action of a steering rear axle 5 relative to a vehicle body 11, thus permitting an improved ride feeling such as on an undulating road. In this respect, the speed sensor 92 and the relay 90 cooperate with each other to constitute a canceller that has an operating phase to render a stopper mechanism in a swing enabling state.

If a current vehicle speed exceeds the preset vehicle speed, the speed sensor 92 detecting that speed operates the relay 90, so that the contact arm 90a detaches from the contact 90b, de-energizing the electromagnetic switch valve 83, which thus has a valve position C switched from the position D. Therefore, when a load is held with forks 63 for a handling service or when a lift switch valve 77 is operated with a lift control lever 75 to have hydraulic oil supplied from a hydraulic pump 53 to a lift cylinder 65, hydraulic oil is supplied from a hydraulic line 79 via the electromagnetic switch valve 83 to the hydraulic cylinder 31, forcing the slider 23 to a swing restricting position, thus restricting a swing action of the steering axle 5 relative to the vehicle body 11, allowing for a fork lift truck to travel at a higher vehicle speed than the preset vehicle speed in a four-wheel rigid manner, with an improved stable traveling performance free of a lifting of front wheel. In this respect, the canceller comprised of the speed sensor 92 and the relay 90 has a non-operating phase to render the stopper mechanism in a swing restricting state.

The speed sensor 92 and the relay 90 may substitute, in combination, for the operation switch 88 in a respective one of the embodiments of FIGS. 6, 8, 10 and 11.

While preferred embodiments of the present invention have been described using specific terms, such description is for illustrative purposes, and it is to be understood that changes and variations may be made without departing from the spirit or scope of the following claims.

What is claimed is:

1. A system for swing restriction of a rear axle of a vehicle in which the rear axle is operatively connected at a transversely central part thereof to a vehicle body and vertically swingable about the connected part relative to the vehicle body and which has a stopper mechanism interposed between the rear axle and the vehicle body for restricting a range of the vertical swing, wherein
the system comprises:
the stopper mechanism adapted
to be operable in a swing restricting state thereof for restricting a swing action of the rear axle relative to the vehicle body and in a swing enabling state thereof for enabling the swing action, and
to be normally held in the swing restricting state, and
a restriction canceler for operating the stopper mechanism to cancel the swing restricting state to enter the swing enabling state;
the stopper mechanism comprises:
a stopper provided on one of the rear axle and the vehicle body,
a swing restricting body provided on the other of the rear axle and the vehicle body, the swing restricting body being movable between
a swing restricting position corresponding to the swing restricting state and being at a first location between the stopper and the other of the rear axle and the vehicle body, and
a swing enabling position corresponding to the swing enabling state and being at a second, different location between the stopper and the other of the rear axle and the vehicle body, and a driver for moving the swing restricting body;

the vehicle has a lift member provided at a front part of the vehicle body for handling a load, and a hydraulic lift cylinder for lifting the lift member;

the driver comprises a driving hydraulic cylinder operative with a pressure of hydraulic oil acting on the hydraulic lift cylinder; and the driving hydraulic cylinder is adapted with the pressure of the hydraulic oil supplied thereto to move the swing restricting body from the swing enabling position to the swing restricting position.

2. The system as claimed in claim 1, further comprising:

an electromagnetic switch valve provided between the hydraulic lift cylinder and the driving hydraulic cylinder, the electromagnetic switch being adapted in a de-energized state thereof to allow a hydraulic oil supply from a hydraulic line for the hydraulic lift cylinder to a hydraulic line for the driving hydraulic cylinder, and in an energized state thereof to interrupt the hydraulic oil supply.

3. A system for swing restriction of a rear axle of a vehicle in which the rear axle is operatively connected at a transversely central part thereof to a vehicle body and vertically swingable about the connected part relative to the vehicle body and which has a stopper mechanism interposed between the rear axle and the vehicle body for restricting a range of the vertical swing, wherein the system comprises:

the stopper mechanism adapted to be operable in a swing restricting state thereof for restricting a swing action of the rear axle relative to the vehicle body and in a swing enabling state thereof for enabling the swing action, and to be normally held in the swing restricting state, and a restriction canceler for operating the stopper mechanism to cancel the swing restricting state to enter the swing enabling state;

the stopper mechanism comprises:

a stopper provided on one of the rear axle and the vehicle body, a swing restricting body provided on the other of the rear axle and the vehicle body, the swing restricting body being movable between a swing restricting position corresponding to the swing restricting state and being at a first location between the stopper and the other of the rear axle and the vehicle body, and a swing enabling position corresponding to the swing enabling state and being at a second, different location between the stopper and the other of the rear axle and the vehicle body, and a driver for moving the swing restricting body;

the vehicle has an engine mounted on the vehicle body;

the driver comprises a negative pressure valve having a valve body operative with a negative suction pressure of the engine supplied thereto, for moving the swing restricting body from the swing restricting position to the swing enabling position; and the system further comprises a negative pressure switch valve for interrupting a supply of the negative suction pressure to the negative pressure valve to have the swing restricting body moved from the swing enabling position to the swing restricting position.

* * * * *